United States Patent Office 3,483,509
Patented Dec. 9, 1969

3,483,509
LIGHT SIGNALLING DEVICES FOR VEHICLES
Gaëtan de Coye de Castelet, Billancourt, France, assignor to Regie Nationale des Usines Renault, Billancourt, Essonne, France
Filed Oct. 24, 1965, Ser. No. 504,355
Claims priority, application France, Dec. 10, 1964, 998,268; Jan. 26, 1965, 3,280
Int. Cl. B60q 1/46
U.S. Cl. 340—81                                     1 Claim

ABSTRACT OF THE DISCLOSURE

An improved signalling control device for vehicle direction indicating and parking lights comprising diodes connected between the direction indicating and parking switches so that current may only pass from the direction indicating to the parking lights.

---

The invention relates to improvements in light signalling devices provided in vehicles and comprising direction-indicating lights and parking lights.

The improvements according to the invention concern a device whereby it is possible either to connect the lateral parking lights automatically to the circuit of the direction-indicating lights and thus to use the said parking lights as lateral repeaters for the direction indication when the vehicle is used; or to isolate the direction-indicating lights from the parking lights when the latter are used at night in order to indicate the position of the vehicle.

In the connection arrangement generally used, this function is achieved by a special switch to which the cables of the two circuits are connected. This arrangement substantially complicates the cabling and introduces voltage drops which may disturb the operation of the flashing control center.

In the device according to the invention, two diodes are inserted between the switches of the direction-indicating lights and the parking lights, these diodes permitting the passage of current only in a single direction, from the circuit of the direction-indicating lights to the parking lights, and blocking the passage of current in the direction from the parking lights to the direction-indicating lights.

The invention also comprises a modified form of the previous arrangement which concerns a device whereby it is possible to make the signalling lights flash simultaneously at both sides of the vehicle.

Some countries require that a vehicle immobilised in traffic or by an accident or a breakdown should have its presence indicated by operating simultaneously two front flashing lights and two rear flashing lights. This operation is to be obtained by a control system and indicated by a warning light separate from the control system and from the direction-indicating warning light.

In this variant, reference is made to a method of connecting the lights by diode and switch, it being understood that the light signals are obtained from a single common flashing control center whose feature is to have a frequency independent of the number of lamps to be supplied beyond two main lamps.

The invention is illustrated in the accompanying drawings in which.

Figure 1:
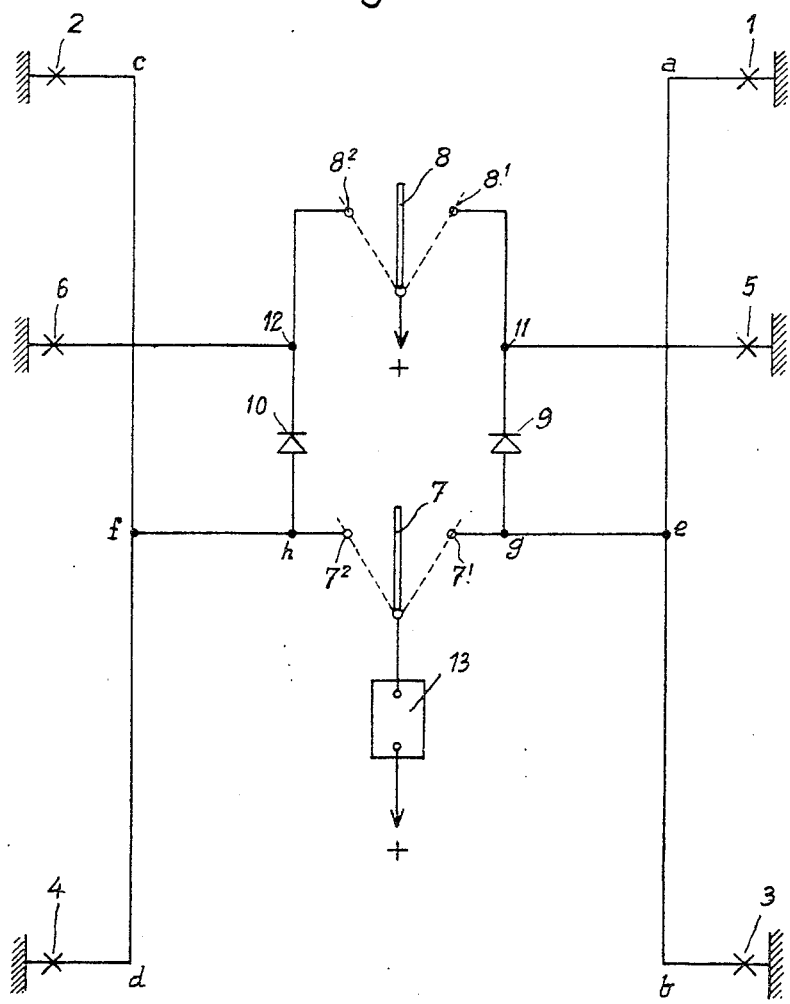
FIG. 1 is an electrical schematic of a first embodiment.

Referring now to the drawing, and more especially to FIGURE 1, the front right-hand direction-indicating light has been indicated diagrammatically at 1 and the front left-hand direction-indicating light at 2, the rear right-hand and left-hand direction-indicating lights at 3 and 4 respectively, an the right-hand and left-hand parking lights at 5 and 6.

The switches for the direction-indicating and parking lights are indicated respectively at 7 and 8. The contacts of the switch 7 are indicated at $7^1$ and $7^2$, and of the switch 8 at $8^1$, $8^2$. The circuits $ab$ and $cd$ connect the lights 1, 2 and 3, 4 to the circuits $e$–contact $7^1$ and $f$–contact $7^2$ while in the circuit $8^1$–$g$ and $8^2$–$h$ the diodes 9 and 10 are arranged, the parking lights 5 and 6 being connected at 11 and 12 to the circuits $8^1$–9 and $8^2$–10. The flashing control center is indicated at 13. The diagram shown is valid for an installation with the negative pole connected to the chassis or the anode of the diode toward the direction-indicating light side. In the case of an intallation with the positive pole connected to the chassis, the anode would be at the parking light side.

Thus situated, these diodes permit the passage of current only from the circuit of the direction-indicating lights towards the parking lights, and block the passage of current in the direction from the parking lights to the direction-indicating lights.

For operation, if, for example, the switch 7 for the direction-indicating lights is placed at the contact $7^1$, the current passes through the flashing control center 13, $7^1$, $e$, $ab$ to the right-hand front and rear direction-indicating lights and by the diode 9 by way of $g$, 11 to the right-hand parking light 5.

If, on the contrary, the switch 7 is left inoperative and the switch 8 for the parking lights is put to the contact $8^1$, the current passing to the parking light 5 will not pass to the right-hand direction-indicating lights, current being blocked by the diode 9.

Figure 2:
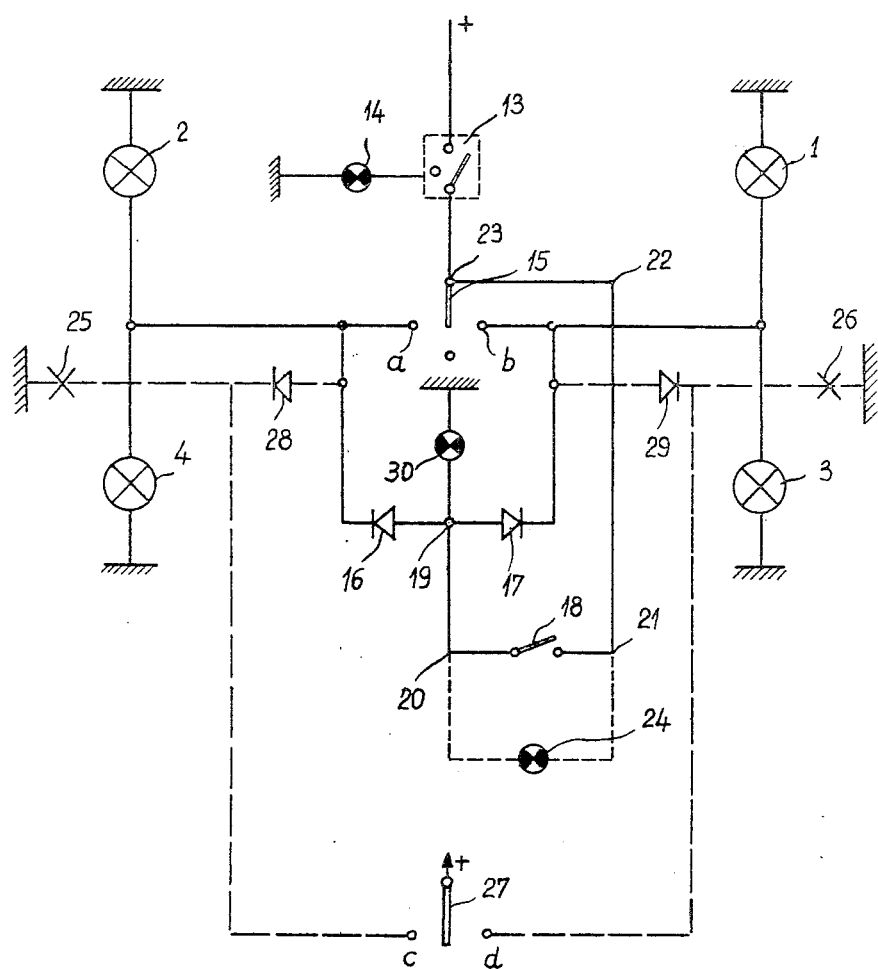
FIG. 2 is an electrical schematic of an alternate embodiment.

Referring now to FIGURE 2 which concerns a modified form of embodiment of the invention, it will be seen that the installation comprises a flashing control center 13, a lamp 14 constituting the direction indicating warning light, a switch 15 with a central point O and two contacts $a$ and $b$, a group of front and rear lamps 2, 4 which are assumed to be situated at the left of the vehicle and connected to the contact $a$ of the switch 15, and a set of front and rear lamps 1, 3 which are assumed to be situated at the right of the vehicle and are connected to the contact $b$ of the switch 15. Also provided are two diodes 16, 17 which have their anodes either in common or connected to one another externally, their cathodes being connected respectively at $a$ for the diode 16 and at $b$ for the diode 17. A lamp 30 arranged between the common point of the anodes of the diodes 16 and 17 and the chassis, serves as a warning means in the case of position-indication by the four lights.

A switch 18 makes it possible to connect the common point 19 of the anodes to the flashing control center 13 by the circuit 19, 20, 21, 22, 23.

The installation operates in the following manner:

(A) AS A DIRECTION INDICATOR

The switch 18 remains open. The swinging of the switch 15 either to $a$ or to $b$ permits supplying current either to the lamps 2 and 4 or the lamps 1 and 3, the lamp 14 being illuminated, the diodes 16 and 17 preventing passage of current in this condition.

(B) AS POSITION-INDICATING LIGHTS

The switch 15 remains in the position O whilst the switch 18 is closed, and the current from the flashing control center passes by way of the circuit 23, 22, 21, 20, the common point 19 and the diode 16 to the lamps 2 and 4, and by way of the diode 17 to the lamps 1 and 3, the four lamps flashing simultaneously.

The warning lamp 30 being supplied with current at the closing of the switch 18, signals that the position-indicating device is operating correctly. Short broken lines are used to indicate an alternate connection of a direction-indicator warning lamp 24 if it is desired to have it out of circuit when changing to the position-indicating lights when the switch 18 is closed.

Dot-dash lines have been used to indicate the connection circuit for the side parking lights 25, 26, permitting them to be operated either as parking lights when the switch 27 is swung to $c$ or $d$, whereas if the switch 15 is put to $a$ or $b$ the current passes to the front and rear right-hand or left-hand side lights and by way of the diodes 28, 29 to the parking lights 25 or 26 which flash the same as the direction-indicating lights in accordance with the foregoing arrangement.

I claim:

1. A signalling system for signalling with the direction indicating lights and parking lights provided on a vehicle comprising a direction indicating light circuit including a flashing control center, at least a left hand pair and a right hand pair of front and rear direction indicating lights and first switch means operatively connected to selectively energize said pairs of lights through said flashing center, a parking light circuit including at least a left hand and a right hand parking light and second switch means operatively connected to selectively energize said parking lights, diode means comprising a first diode connecting the left hand pair of direction indicating lights and the left hand parking light, and a second diode connecting the right hand pair of direction indicating lights and the right hand parking light, said diode means being oriented to permit current to pass to the direction indicating lights and parking lights when said first switch means is actuated and to block current from passing to the direction indicating lights when said second switch means is actuated, further diode means having two corresponding anodes interconnected, third switch means connected with said interconnected anodes and with said flashing center, said further diode means having their two other corresponding cathodes respectively connected to said first diode and left hand indicating lights, and to said second diode and right hand indicating lights, so that all of said direction indication lights and parking lights flash simultaneously when said third switch means is actuated.

References Cited

UNITED STATES PATENTS

| | | | |
|---|---|---|---|
| 3,263,119 | 7/1966 | Scholl | 340—81 X |
| 3,321,663 | 5/1967 | Poznik | 340—81 X |
| 1,909,072 | 5/1933 | Prescott. | |
| 2,203,502 | 6/1940 | Michel. | |
| 2,308,844 | 1/1943 | Wilshusen | 340—87 |
| 2,760,050 | 8/1956 | Porsche | 240—8.22 X |
| 3,040,207 | 6/1962 | Grontkowski. | |
| 3,273,117 | 9/1966 | Martauz | 340—81 |
| 3,308,427 | 3/1967 | Hess | 340—81 X |

JOHN W. CALDWELL, Primary Examiner

K. N. LEIMER, Assistant Examiner

U.S. Cl. X.R.

340—176